F. C. SCHMITZ.
MACHINE FOR MAKING BARRELS.
APPLICATION FILED DEC. 31, 1912.

1,184,030.

Patented May 23, 1916.
5 SHEETS—SHEET 5.

UNITED STATES PATENT OFFICE.

FRANK C. SCHMITZ, OF FLATBUSH, NEW YORK.

MACHINE FOR MAKING BARRELS.

1,184,030.   Specification of Letters Patent.   Patented May 23, 1916.

Substitute for application Serial No. 575,496, filed August 4, 1910. This application filed December 31, 1912. Serial No. 739,530.

*To all whom it may concern:*

Be it known that I, FRANK C. SCHMITZ, a citizen of the United States, residing at Flatbush, in the county of Kings and State of New York, have invented certain new and useful Improvements in Machines for Making Barrels, of which the following is a specification.

My present invention pertains to improvements in machines for making barrels of sheet fiber and the like, the advantages and construction of which will be herein set forth, reference being had to the annexed drawings, wherein:

The main object of the present invention is to provide a mechanism which will curve or conform a sheet of material, preferably artificial board or the like, about a mandrel and hold it in such position while the edges thereof are secured in place, and to thereafter automatically present a head or bottom to one end of the barrel body thus formed, said head being automatically secured in place upon the barrel body and thereafter moved laterally, withdrawing the barrel from the mandrel.

The construction is such that when the barrel, with one head or bottom secured thereto, is fully withdrawn from the mandrel and the main supporting frame, the head will be automatically disengaged from the head-presenting device or mechanism, whereby the body with one head or bottom thereon will be automatically discharged from the machine.

Figure 1:
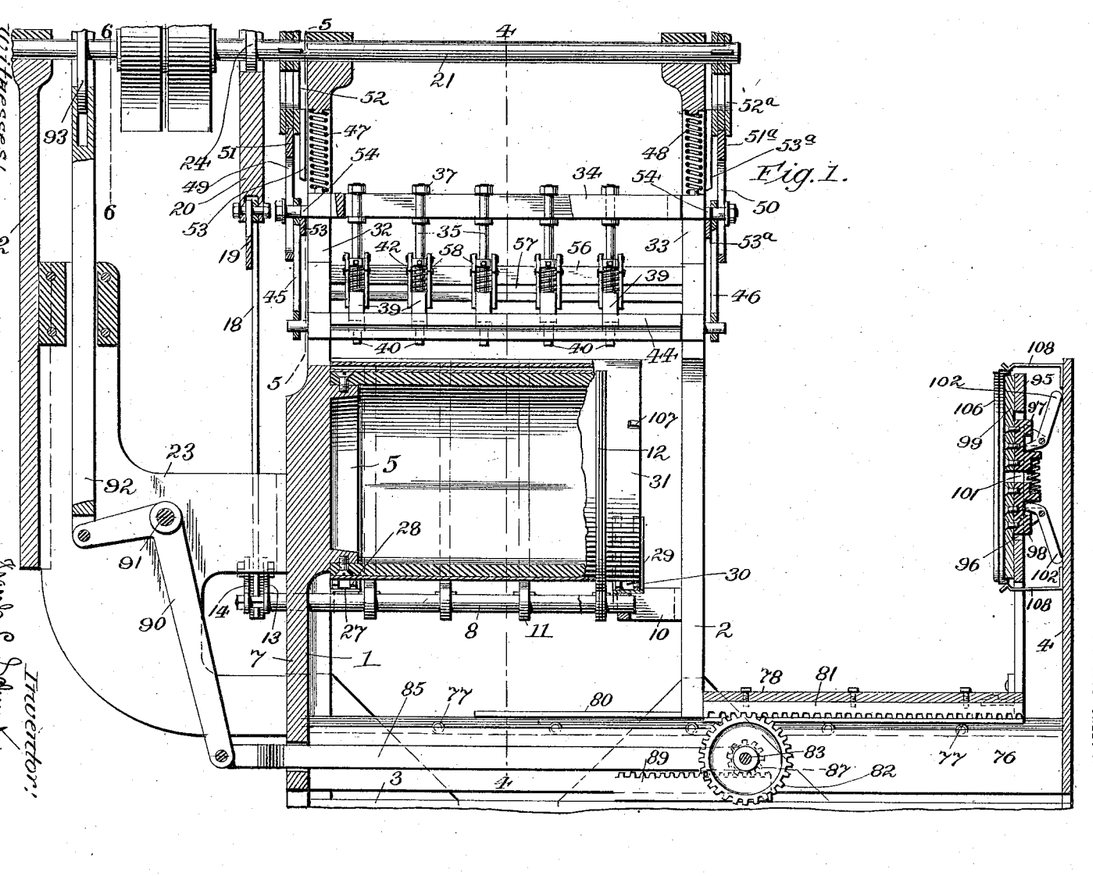
Figure 1 is a longitudinal sectional elevation of the machine, the parts being shown in such position that the blank has been drawn around the mandrel and the staple-drivers are about to descend to secure the overlapped edges of the blank together, the head-carrying frame being shown in its extreme outward position, with a head or bottom thereon, preparatory to movement toward the barrel body, with the view of securing the head in place.
Figure 2:
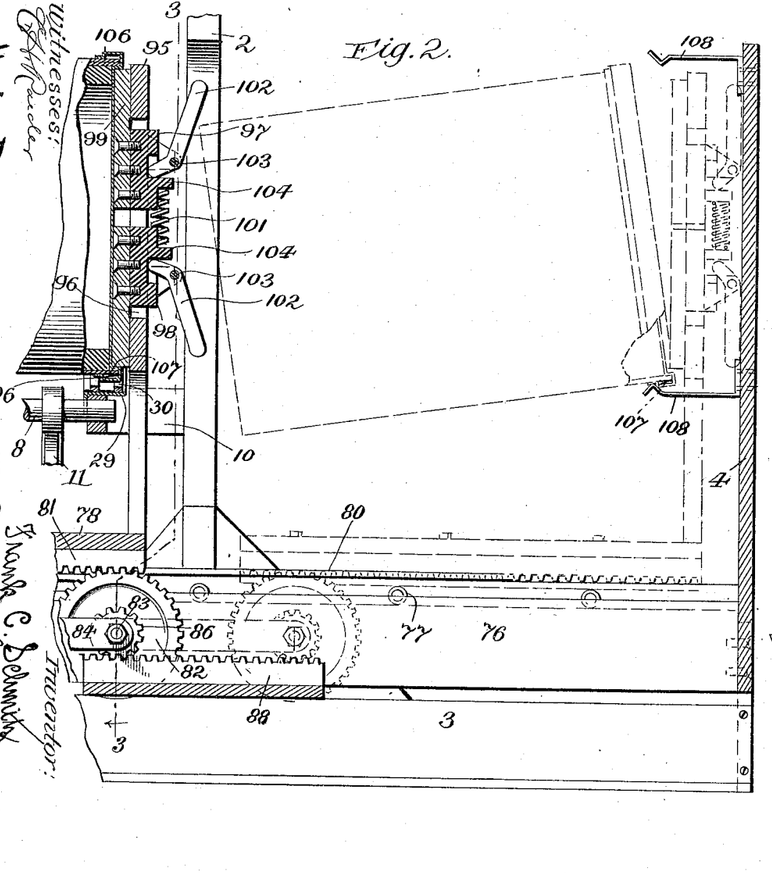
Fig. 2 an enlarged vertical sectional view of the head-positioning mechanism.
Figure 3:
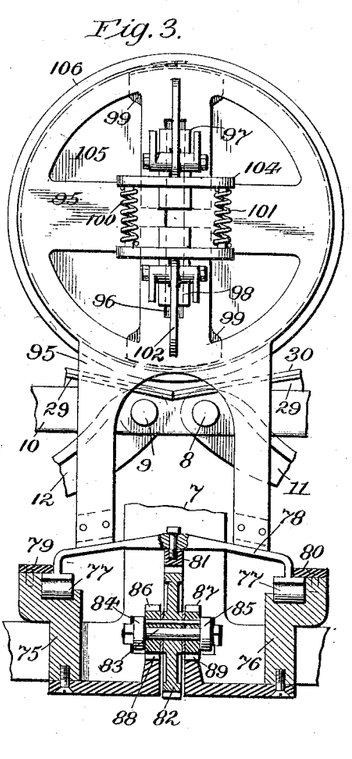
Fig. 3 a transverse vertical sectional view, taken on the line 3—3 of Fig. 2, looking in the direction of the arrow.
Figures 4, 5, 6:
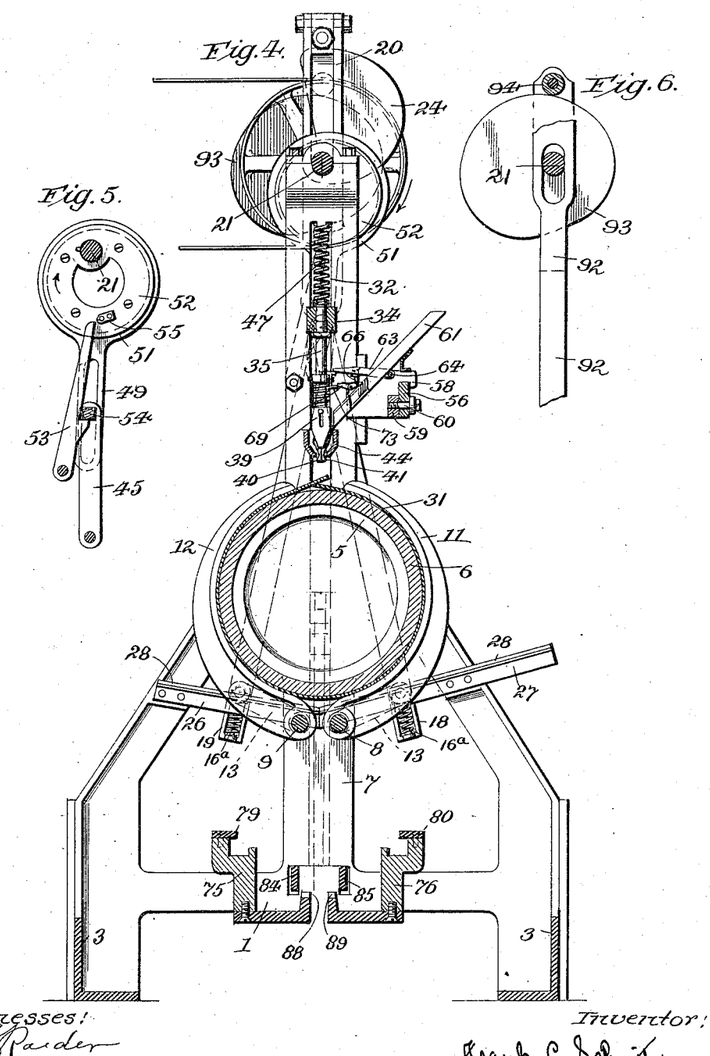
Fig. 4 a transverse vertical sectional view, taken on the line 4—4 of Fig. 1.
Fig. 5 a detail sectional view, on the line 5—5 of Fig. 1, and illustrating the cam or eccentric and its allied parts which release the staple-driving mechanism.
Fig. 6 a similar view taken on the line 6—6 of Fig. 1 and illustrating the cam which actuates the movable head-carrier frame.

A frame 1, of the form best shown in Figs. 1 and 4, is connected to a second frame 2 by longitudinally-disposed members 3, said members extending beyond the frame 2, and at the outer end thereof is secured a third frame or bar 4. The frame 1 is provided with a collar or flange 5, to which is secured a mandrel or form 6, the outer face of which will preferably be polished. Mounted in bearings formed in the centrally-disposed member 7 of the frame 1 are two shafts 8 and 9, the opposite ends of said shafts being seated in a bracket 10, secured to the frame 2. A series of folder or conforming arms 11 are secured to the shaft 8, while a similar series of arms 12 are secured to the shaft 9. The outer end of each shaft is squared, see Figs. 7 and 8, and upon the end of each shaft there is secured a pair of arms 13 and 14, through the outer ends of which are passed a bolt 15. Said bolt bears upon a block 16, which is urged upwardly against the bolt 15 by a spring 16ª, located in a recess formed in the lower end of a draw bar 18 or 19, as the case may be, which bars are respectively connected to the arms carried by the shafts 8 and 9. The draw bars 18 and 19 are pivotally connected to the lower end of a slotted slide 20, through which passes the main shaft 21 of the machine. Said shaft, as will be seen upon reference to Fig. 1, has its bearing in the frames 1 and 2, and also in a fourth frame 22, secured in vertical alinement with the frame 1 by a bracket or other suitable support 23.

The shaft 21 has secured to it a cam 24, said cam acting upon a bowl or roller 25 mounted in the upper portion of the slide 20. It will be seen that upon rotation of the cam in the direction of the arrow, in Fig. 7, the shafts 8 and 9 will be moved or partially rotated about their axes, and as a consequence, the arms will be drawn upwardly and around the mandrel 6. The members are so proportioned and arranged that the series of arms 11 will be positioned slightly in advance of the arms 12, so that the fiber board or whatever other stock may be used, will have one edge squarely folded down upon the mandrel before the other edge comes to overlapping position. The employment of the springs and bearing blocks 16 permits the cam to make a slight movement after the stock has been conformed to the mandrel, whereby the stock will be held firmly in place just prior to the descent of the staple-driving mechanism.

The stock is positioned with reference to the mandrel and over the folding or conforming arms by what may be termed a two-part table, one portion being composed of L-shaped angle-irons 26, 27 secured to the frame 1, said angle-irons preferably having secured upon their upper face wooden strips 28. A second pair of angle-irons 29 is mounted upon the bracket 10, said irons being preferably provided with wooden strips 30, similar to the strips 28.

Figures 7, 8, 12:
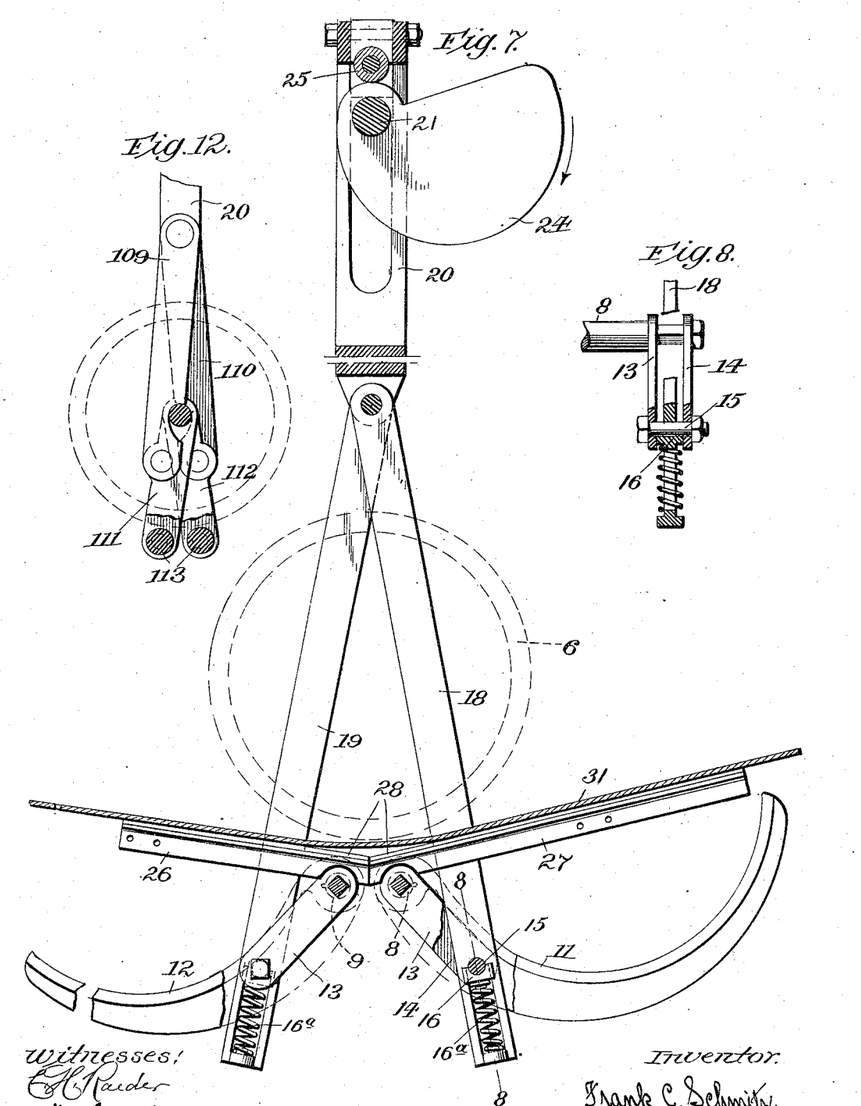
Fig. 7 an enlarged vertical sectional view of the folding arms employed to conform the sheet about the mandrel and the actuating mechanism for said arms.
Fig. 8 a sectional elevation, taken on the line 8—8 of Fig. 7, showing the detail of the connection between one of said arms and the link which operates it.
Fig. 12 an elevation of a modified mechanism employed to conform the material about the mandrel.
Figures 9, 11:
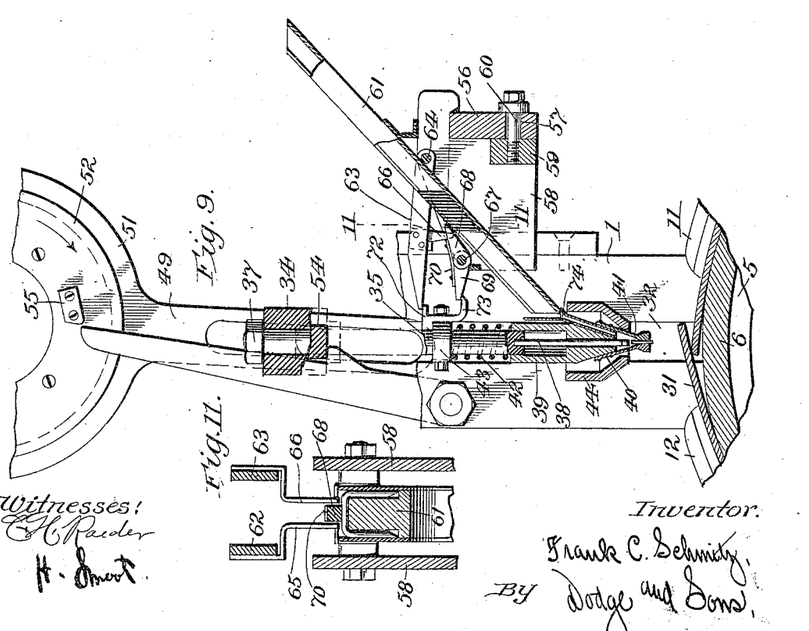
Fig. 9 a vertical sectional view of the staple-presenting and driving mechanism, the parts being shown in their elevated position just prior to descending to drive the staples.
Fig. 11 a transverse vertical sectional view on an enlarged scale, taken on the line 11—11 of Fig. 9.
Figure 10:
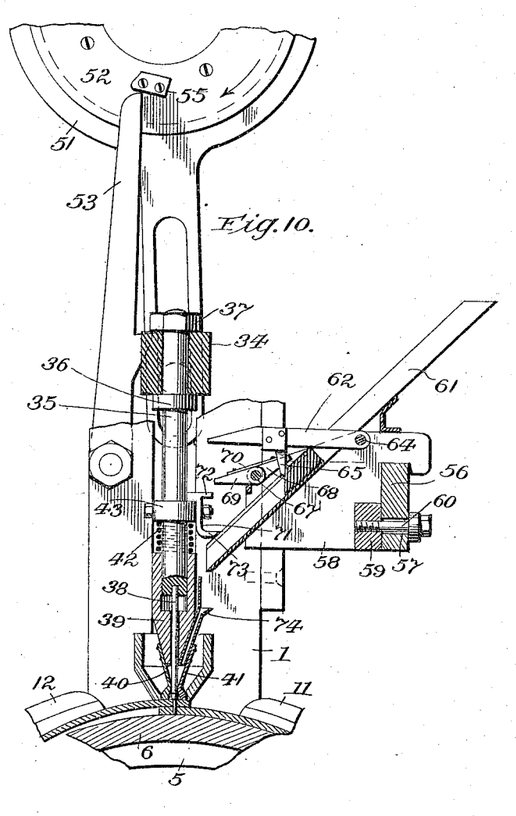
Fig. 10 a similar view in which the parts have descended and the staples have been driven.

A sheet of paper-board 31 from which the body of the barrel is formed is shown in its initial position in Fig. 7, and in position to be nailed in Figs. 4 and 9. In Fig. 10 the edges are shown as brought into intimate contact and a staple driven therethrough. To drive the staples the mechanism shown in detail in Figs. 1, 4, 9, 10 and 11 is employed. The upper portions of the frames 1 and 2 are each provided with a vertically-disposed slot or way, as 32, 33, into which extend the ends of a hammer-supporting bar 34, said bar being provided with a vertical longitudinal slot in which are secured the upper ends of a series of staple-drivers. Each of the hammers and staple-feeding mechanisms are identical and a description of one will suffice for all. A rod or bar 35, provided with a shoulder 36, is secured in a slot in the hammer-carrying bar 34 by a nut 37, the shouldered portion bearing against the lower face of the bar, while the nut rests upon the upper face thereof. The lower end of the rod 35 carries a hammer 38, said hammer passing downwardly through an opening in a sleeve 39, the upper portion of which makes sliding contact with the lower end of the rod 35. The lower outer face of said sleeve is tapered and carries two spring arms or members 40, 41, the normal position of the parts being such that the lower ends thereof come into such relation that they are spaced apart the thickness of a staple, which they are designed to hold prior to the driving thereof. A spring 42 is interposed between the upper end of the sleeve 39 and the lower face of a collar 43 which is adjustably mounted upon the rod 35. When the parts are in their normal elevated position, this spring is not under compression, but when lowered, as in the act of driving (see Fig. 10), the spring is placed under compression.

A trough-shaped hammer guide bar 44, having a slot in the lower face thereof of a width approximately equaling the aggregate width of the spring arms 40 and 41 and the thickness of the hammer 38, is placed below each of the hammers, the ends of the bars extending into the slots or ways 32 and 33 and being connected to the bar 34 so as to move therewith by links 45 and 46. Relatively heavy coil springs 47 and 48 are interposed between the upper face of the bar 34 and the upper ends of the walls of the slots 32 and 33, said springs tending normally to force the bar 34 downwardly. Slotted links 49 and 50 pass over the opposite ends of the bar 34, said links being formed as downward extensions of eccentric straps 51 and 51$^a$, respectively. Said straps work in conjunction with eccentrics 52 and 52$^a$ secured upon the main driving shaft 21. When the links 49 and 50 are raised to their uppermost position, by reason of the rotation of the eccentrics, gravitating latches 53, 53$^a$, one for each end of the bar, swing inwardly beneath the squared portions 54 formed upon the outward extensions or end sections of the hammer-carrying bar 34. Said latches are, as will be seen upon reference to Figs. 9 and 10, pivoted at their lower ends to the adjacent frame 1 or 2, as the case may be, and extend upwardly to a point where they overlie the face of the respective eccentric, each of which eccentrics is provided with a knock-off block, as 55. The function of these blocks is to throw the latch outwardly from the position shown in Fig. 9 to that shown in Fig. 10, permitting the hammer bar to descend.

Secured to the frames 1 and 2 is a bar 56, provided with a horizontally-disposed slot 57, adjacent to the lower end thereof. Said bar forms a support for the staple-feeding devices, one of which is used in conjunction with each hammer. A plate, as 58, provided with a lug 59 through which the plate is connected to the bar by a machine screw or bolt 60, passing through slot 57, forms the support for a staple-chute 61. Said plate also forms the support for a pair of arms 62 and 63, see Fig. 11, which are fulcrumed upon a rod 64, said arms being provided with downwardly-depending fingers 65 and 66, the lower ends of which extend into the path of the staples as they pass down the chute.

Fulcrumed upon a pin 67 are two arms 68 and 69, said arms being connected to each other by a spring plate 70, which overlies the upper face of said arms. Secured to the sleeve or collar 43 is a bracket or casting 71, provided with two striking lugs or fingers 72 and 73, the upper finger being slightly shorter than the lower, so that as the hammer bar 35 is moved upwardly, carrying the bracket with it, the upper finger will clear the outwardly-projecting end of the arm 69. The fingers are so spaced that the lower finger 73 will contact with the outwardly-extending arm 69 and tend to rock said arm and the arm 68 just prior to the finger 72 coming into contact with the outwardly-projecting ends of the arms or levers 62 and 63. Thus the free end of the arm 68 will be thrown downwardly upon the staples in the chute or runway, with the exception of the lowermost, and thereafter, through the elevation of the arms 62 and 63, the fingers 65 and 66 will be withdrawn from in front of the lowermost staple, permitting the staple to move by gravity down the chute or way therein and pass into a channel or guideway 74, carried by the lower end of the sleeve 39 and terminating at a point above the arms 40 and 41.

The operation of the staple-driving mechanism is as follows: With the parts in the positions shown in Fig. 9. and the hammer bar held in its elevated position by the latches 53 and 53$^a$, the springs 47, 48 will be under compression. When the eccentrics, through their continued rotation, bring the blocks 55 into contact with the upper ends of the latches 53, 53$^a$, and thereby release the same from contact with the squared portions 54 of the hammer bar, the springs will immediately throw the hammer bar and the hammer guide bar 44 downwardly into the position shown in Fig. 10. The hammer guide bar 44 will bear upon the outermost face of the overlapped edges of the board 31, forcing the same down into contact with the board, and the broadened ends of the spring arms 40 and 41 will also be forced downwardly against the adjacent face of the barrel-body, the hammer likewise descending and driving the staple which has been previously positioned and held between the spring arms 40 and 41. As the parts move downwardly, the arms 62 and 63 will drop by gravity and the fingers 65 and 66 will pass downwardly in front of the lowermost staple of those in the chute, said staple being held against movement by the arm 68. Just after the arms 62 and 63 are released, the arms 68 and 69 will gravitate into the position shown in Fig. 10, thereby releasing the staples and permitting them to move downwardly in the chute so that the lowermost one rests against the arms 65 and 66. The downward movement of the driving mechanism will carry the ends of the hammer-carrying bar 34 almost down to the lower end of the slots formed in the links 49 and 50, and upon continued rotation of the eccentric the hammer bar will be again lifted and when it reaches its highest point the latches 53, 53$^a$ will swing inwardly and hold the same in such position, with the springs 47 and 48 under compression. During such operation the conforming arms 11 and 12 will be maintained in their closed position upon the sheet. After the sheet is secured by the staple, the arms may be released, and such release must take place before the body is stripped from the mandrel. To effect this stripping and also to place the head upon one end of the barrel body thus formed, the following mechanism is employed, reference being had particularly to Figs. 1, 2, 3 and 4:

Extending from the frame 1 to the outermost frame 4 are two bars 75 and 76, the bars being preferably of the form shown in cross-section in Fig. 4. The upper face of each bar is provided with a groove or channel for the reception of a series of rollers 77, upon the upper face of which rests a carriage 78, the carriage being held in position by plates 79 and 80, secured to the bars and overlying the extended bearings formed upon the base of the carriage. Said carriage is likewise provided on its under face with a rack 81, which meshes with a relatively large gear 82, said gear being mounted upon an axle 83, the outer ends of which find their bearing in the ends of a pair of links or draw-bars 84 and 85. Small pinions 86 and 87 are likewise mounted upon the axle and are pinned to the gear 82 so as to rotate therewith. Said pinions 86 and 87 mesh with racks 88 and 89 secured to the under face of the bars 75 and 76 respectively. The links or draw-bars 84, 85 extend through an opening formed in the lower portion of the frame 1 and are connected to the lower end of the long arm of an elbow-lever 90, fulcrumed at 91 upon the bracket 23. The shorter arm of the elbow-lever is pivotally connected to the lower end of a link 92, the upper end of which is forked and straddles a cam 93, mounted upon the main driving shaft 21.

As will be seen upon reference to Fig. 6, the bifurcated ends are slotted so as to permit the shaft 21 to pass therethrough and to form a guide for the link 92, and a roller 94 is mounted between the upper ends of the arms of the link and rests upon the cam 93.

As the shaft 21 rotates and the cam 93 is moved therewith, it will raise and lower the link 92 and rock the elbow-lever 90 upon its fulcrum, thereby actuating the draw-bars 84 and 85 and consequently moving the pinions 86 and 87 over their respective racks. This causes the rotation of the large gear 82 and consequently will impart a reciprocating movement to the carriage 78, which has secured to it the rack 81 that meshes with said gear 82. By reason of the proportioning of the gearing the movement of the carriage will be multiplied considerably over the movement of the draw-bars or links 84 and 85. The carriage has secured to it, at its outer end, a vertically-disposed frame 95, the upper or head portion of said frame being provided with a vertically-disposed slot 96 in which are mounted slides 97 and 98, respectively. Each slide has secured to its outer face a block 99. The slides 97 and 98 are normally moved apart by interposed springs 100 and 101. Each slide is provided with means for moving the same inwardly toward the center of the frame 95, and said means comprises an elbow-lever 102, fulcrumed upon a pin or shaft 103, the shorter end of the lever passing into a recess formed in the rear face of the slide, or in other words, contacting with a lug or flat face 104 formed upon the rear portion of the slide.

The head (or bottom, hereinafter referred to as the head) which it is proposed to position is formed of sheet metal and is provided with a central depressed portion, as 105, and likewise with an inwardly-projecting rim or flange 106, which is adapted to coact with a series of spring clips, as 107, secured upon the stock of which the barrel-body is formed adjacent to one end thereof prior to its being formed about the mandrel. The outer end of each block 99 is curved to conform to the radius of the wall of the depressed portion of the head and said head is passed over said blocks while the carriage and head-supporting frame 95 are at the extreme right, in which position the blocks are moved inwardly toward the center of the frame by reason of the fact that the long arms of the elbow-levers 102 have come into contact with the fixed frame 4 and been thereby forced to the position shown in dotted lines in Fig. 2, in which position the springs 100 and 101 are placed under compression. The operator positions the head between a plurality of spring arms 108, secured to the fixed frame 4 and extending outwardly beyond the face of the blocks 99 to a slight extent, when the carriage and frame 95 will move to their extreme position at the right. As the carriage is moved to the left the elbow-levers assume their normal position and the blocks 99 move out radially, coming into contact with the walls of the depressed portion 105 of the head, thereby securely clamping the head upon the frame 95. A further movement of the carriage and frame to the left will release the head from the spring arms or fingers 108. The continued movement of the carriage to the left will force the head over the spring clips 107, whereby the head will become permanently locked to the barrel body. The parts are so proportioned that the carriage will come to rest when this operation is effected and immediately thereafter it will start upon its retrograde or outward movement, the blocks 99 still being held in locking contact with the head and consequently drawing or stripping the barrel body from the mandrel as the head and body are at such time interlocked. When the carriage reaches its extreme position at the right, the blocks are again moved inwardly through the action of the elbow-levers 102 and the barrel will be discharged from the machine, dropping off as shown in dotted lines in Fig. 2, onto a conveyer or into the hands of an attendant who may stand ready to catch the same. It is to be noted that the cams and eccentrics are so timed that the parts will operate in unison, the forms curving around the mandrel, after which the stapling devices will descend and again ascend, and thereafter the head-presenting mechanism will be moved so as to force the head over the barrel, and simultaneously therewith the folding arms or members will be withdrawn. As they are withdrawn, the carriage is moved to the right and the barrel, with one head attached, is stripped from the mandrel.

In Fig. 12 a modification of the sheet-positioning mechanism is illustrated. Secured to the lower end of the link or slide 20, which is the same as in the former construction, are two pivoted links 109 and 110, the lower ends of said links being connected, respectively, to arms 111 and 112. The inner ends of said arms are mounted upon a bearing concentric with the axis of the drum or mandrel about which the material is to be formed. Each arm carries a roller 113. Upon an upward movement of the links the rollers will be carried around adjacent to the periphery of the drum or mandrel, and if a sheet of material be interposed between the same it will be carried by the rollers into the desired form, ready for the operation of the fastening devices. One roller may be given a slight movement in advance of the other by changing the pivotal connection of the arm which carries said roller to the actuating link.

It will be readily appreciated that in so far as the generic invention is concerned the staple-driving mechanism may be varied, and in fact the invention in its broadest aspect is not to be limited to the employment of staples, as other fastening means may be used.

This application is a substitute for my previous application, Serial No. 575,496, filed August 4, 1910, to which reference is hereby made.

Having thus described my invention, what I claim is:

1. In a barrel-making machine, the combination of a mandrel; means for forming a sheet of material about the same; and head-presenting mechanism movable toward and from the mandrel and adapted to place a head upon the barrel thus formed and while it is still upon the mandrel, and to finally withdraw the barrel-body from the mandrel after the head is positioned.

2. In a barrel-making machine, the combination of a mandrel; means for forming and temporarily holding a sheet about the mandrel; means acting while the sheet is thus held to secure the edges of the sheet together; and means for placing a head upon the body thus formed while still upon and supported by the mandrel.

3. In a barrel-making machine, the combination of a mandrel; means for supporting a sheet of material adjacent to the mandrel; a pair of shafts located in proximity to said supporting means; a plurality of conforming arms carried by each shaft; and means for actuating said shafts and thereby causing the arms to pass by the supporting means, to lift the sheet and to carry the same about the mandrel.

4. In a barrel-making machine, the combination of a mandrel; a sheet-supporting device located adjacent to the mandrel, said device being dished, whereby the sheet from which the barrel-body is formed will be given an initial curvature; and sheet-conforming means normally located below said device and adapted when moved to lift the sheet from the device and conform the same about the mandrel.

5. In a barrel-making machine, the combination of a mandrel; a sheet-supporting device located adjacent thereto; a pair of rocker shafts arranged immediately below said device; a series of conforming arms carried by each shaft; a reciprocating frame; a pair of links or draw-rods pivotally connected thereto; and a yielding connection between the lower end of each link and the adjacent shaft.

6. In a barrel-making machine, the combination of a mandrel; a sheet-conforming mechanism; means for driving a series of fastenings into the sheet when conformed to secure the same; head-positioning mechanism; and means for actuating the parts to first cause the conforming mechanism to act, then to cause the driving means to function and recede, and finally to cause the head-positioning mechanism to advance, and thereafter, while still maintaining its grip upon the head, to recede and withdraw the barrel-body from the mandrel.

7. In a barrel-making machine, the combination of fixed or stationary means for holding a barrel-body; means for temporarily holding a barrel-head; and unitary means adapted to automatically and positively engage said head and advance it to and place it upon one end of the barrel body and, upon a retrograde movement, to remove the barrel body and the then attached head from the body-holding means.

8. In a barrel-making machine, the combination of fixed or stationary means for supporting a barrel-body; and an expansible device adapted to engage and support or hold a barrel-head independently of the barrel-body supporting means and to advance the same to and place it upon the barrel body, and upon a retrograde movement of said device to remove the barrel body from its supporting means.

9. In a barrel-making machine, the combination of fixed or stationary means for supporting a barrel-body; a carriage movable toward and from said body; and means mounted upon said carriage for engaging and holding a barrel-head and, as the carriage is moved toward the barrel-body, to force the same into position thereon and thereafter, upon a retrograde movement of the carriage, to remove the barrel with the attached head from the body-supporting means.

10. In a barrel-making machine, the combination of fixed or stationary means for supporting a barrel-body; a carriage; means for moving the carriage toward and from the barrel-body; and an expansible device mounted on said carriage and adapted to engage a barrel-head and to hold the same in position for engagement with the barrel-body when the carriage is moved in one direction and to remove the barrel body from its supporting means when moved in the opposite direction.

11. In a barrel-making machine, the combination of means for supporting a barrel-body; a carriage; a fixed frame located in line with the barrel-supporting means adjacent to the limit of outward travel of the carriage; and head-holding means mounted on the carriage, said means coacting with the fixed frame to render it inoperative for holding a barrel-head, said means automatically expanding and engaging a previously-positioned head as said means is moved with the carriage away from the fixed frame.

12. In a barrel-making machine, the combination of means for supporting a barrel-body; a normally expanded head-holding means; a fixed abutment adapted to coact with said means to contract the same; and 13. In a barrel-making machine, the combination of means for supporting a barrel-body; a fixed abutment; a barrel-head holding means; means for normally causing it to engage a barrel-head; means coöperating with said barrel-head holding means and the fixed abutment for contracting said barrel-head holding means when the same is moved into operative relation with said abutment; and means for traversing said barrel head holding means toward and from the barrel-body supporting means.

14. In a barrel-making machine, the combination of means for supporting a barrel-body; a carriage; a frame mounted upon and movable with said carriage; blocks mounted in said frame; means for normally moving said blocks away from each other; a pair of elbow-levers, one arm of each engaging one of the blocks; a fixed abutment arranged in line with the outer or free ends of said elbow-levers and adapted, when the two are brought into contact, to rock the levers and to force the blocks toward each other; and means for traversing the carriage back and forth between the barrel-body supporting means and the fixed abutment.

15. In a barrel-making machine, the combination of means for supporting a barrel-body; a carriage; a frame mounted upon and movable with said carriage; a pair of radially-movable blocks mounted on said frame; means for normally forcing said blocks outwardly away from each other; a pair of elbow-levers mounted upon the frame, the short arm of one of said levers engaging one of the blocks; a fixed abutment located in line with the levers and arranged at a point adjacent to the outward limit of travel of the carriage, said abutment adapted to coöperate with the free ends of the levers and to move the blocks inwardly; a plurality of spring arms secured to the fixed abutment and adapted to hold a barrel-head in alinement with said blocks; and means for moving the carriage back and forth between the fixed abutment and the barrel-body supporting means.

16. In a barrel-making machine, the combination of means for supporting a barrel-body; a fixed abutment; a carriage mounted upon ways and adapted to be moved back and forth between said abutment and the barrel-body supporting means; a rack secured to the carriage; a fixed rack; multiplying gearing interposed between said racks; means for moving said gearing over the fixed rack and thereby imparting movement to the carriage; a frame mounted upon and movable with the carriage; and barrel-head clamping mechanism carried by said frame for engaging a head and positioning the same on the barrel-body as the carriage is moved to its extreme position in one direction.

In testimony whereof I have signed my name to this specification in the presence of two subscribing witnesses.

FRANK C. SCHMITZ.

Witnesses:
CHARLES A. STILES,
CHAS. S. BRYAN.

Copies of this patent may be obtained for five cents each, by addressing the "Commissioner of Patents, Washington, D. C."